United States Patent
Godowski et al.

(10) Patent No.: US 10,324,699 B2
(45) Date of Patent: Jun. 18, 2019

(54) ENHANCEABLE CROSS-DOMAIN RULES ENGINE FOR UNMATCHED REGISTRY ENTRIES FILTERING

(71) Applicant: International Business Machines Corporation, Armonk, NY (US)

(72) Inventors: Piotr P. Godowski, Cracow (PL); Piotr Kania, Cracow (PL); Michal Paluch, Cracow (PL); Tomasz Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 14/969,711

(22) Filed: Dec. 15, 2015

(65) Prior Publication Data

US 2017/0168794 A1   Jun. 15, 2017

(51) Int. Cl.
    *G06F 8/70* (2018.01)
    *G06F 9/445* (2018.01)
    *G06F 8/61* (2018.01)

(52) U.S. Cl.
    CPC .............. *G06F 8/61* (2013.01); *G06F 8/70* (2013.01); *G06F 9/44505* (2013.01)

(58) Field of Classification Search
    CPC ..... G06F 8/61; G06F 8/62; G06F 8/70; G06F 9/44505
    See application file for complete search history.

(56) References Cited

U.S. PATENT DOCUMENTS 8,539,445 B2   9/2013   Gangemi et al.
9,053,112 B2   6/2015   Rathod et al.
(Continued)

FOREIGN PATENT DOCUMENTS

CA   2597543   8/2006

OTHER PUBLICATIONS

Wang, Y-M., et al. "Detecting stealth software with strider ghostbuster." Dependable Systems and Networks, 2005. DSN 2005. Proceedings. International Conference on. IEEE. (Year: 2005).*

(Continued)

*Primary Examiner* — Chameli Das
*Assistant Examiner* — Joanne G Macasiano
(74) *Attorney, Agent, or Firm* — Lieberman & Brandsdorfer, LLC

(57) ABSTRACT

Identification of unmatched registry entries may be provided, by scanning a file system, discovering software, collecting first attribute values of the discovered software, receiving a plurality of filtering rules including a method and an attribute. The attribute may comprise a software-specific condition. The method may further comprise collecting native registry entries comprising second attribute values indicated by said attributes of at least one of said rule, and comparing said first attribute values of said discovered software with related ones of said second attribute values of said collected native registry entries. Then, the native registry entries may be grouped into two groups. The first group represents matched registry entries and the second group represents unmatched registry entries. The unmatched registry entries may be identified as unequivocal entries for further software discovery. Finally, the filtering rules may be applied against said collected registry entries based on said filtering method.

20 Claims, 4 Drawing Sheets

(56) References Cited

U.S. PATENT DOCUMENTS

| | | | |
|---|---|---|---|
| 2003/0110253 A1* | 6/2003 | Anuszczyk | G06F 8/70 709/224 |
| 2005/0049973 A1* | 3/2005 | Read | G06F 21/10 705/59 |
| 2005/0060638 A1* | 3/2005 | Mathew | G06Q 10/06 715/255 |
| 2006/0048136 A1* | 3/2006 | Vries | G06F 8/60 717/174 |
| 2009/0248636 A1* | 10/2009 | Gangemi | G06F 8/60 |
| 2010/0332507 A1* | 12/2010 | Saadat | G06Q 30/02 707/759 |
| 2013/0124513 A1* | 5/2013 | Bignert | G06F 17/30707 707/728 |
| 2015/0134534 A1* | 5/2015 | Lai | G06F 21/105 705/59 |
| 2015/0278526 A1* | 10/2015 | Bhattacharya | G06F 21/577 726/1 |
| 2016/0217282 A1* | 7/2016 | Vecera | G06F 21/565 |

OTHER PUBLICATIONS

Hipson, Peter D., et al., Mastering Windows XP Registry. Sybex. "Chapter 8: Getting Rid of the Unwanted" pp. 142-159 (Year: 2002).*

Anonymous, Viewing Unmatched Registry Entries, IBM Knowledge Center, IBM Tivoli Asset Discovery, Version 7.5, Sep. 14, 2015, p. 1.

* cited by examiner

ENHANCEABLE CROSS-DOMAIN RULES ENGINE FOR UNMATCHED REGISTRY ENTRIES FILTERING

FIELD OF THE INVENTION

The invention relates generally to a method for identifying unmatched registry entries. The invention relates further to a related software discovery system for identifying unmatched registry entries and a computer program product.

BACKGROUND

Modern data centers are advantageously managed using system management software or software asset management systems. These may need comprehensive data about installed software of the computing systems under control. However, there may be circumstances that lead to a mismatch between software products that may be registered in a software catalog, e.g. a registry, and software that is actually installed and used on a given computing system or peripheral device. In order to properly manage the computing systems, due to compliance rules, and in order to manage user licenses according to contractual requirements, it may be required to have a clear view about supposedly installed software and actually installed software on a given computing system and/or a data center landscape.

Several approaches have been used and some experimentation goes on to map discovered software to tracked software in software catalogues. None of these methods and systems are perfect or guarantee a 100% recognition in either way: discovered software versus. registered software or registered software versus discovered software. There are always mismatches that require a labor intensive manual compare and match process.

SUMMARY

This need may be addressed by a method for identifying unmatched registry entries, a software discovery system for identifying unmatched registry entries, a computing system, and a computer program product, according to the independent claims.

According to one aspect, a method for identifying unmatched registry entries may be provided. The method may comprise scanning a file system and discovering software, collecting first attribute values of the discovered software, and receiving a plurality of filtering rules, wherein each rule may comprise at least an attribute and a filtering method, wherein the attribute comprises software-specific conditions.

Furthermore, the method may comprise collecting native registry entries comprising second attribute values indicated by the attributes of at least one of the rules, and comparing the first attribute values of the discovered software with related ones of the second attribute values of the collected native registry entries.

Moreover, the method may comprise grouping said native registry entries into two groups, wherein a first group may represent matched registry entries, and a second group may represent unmatched registry entries, thereby identifying—in particular marking—unmatched registry entries as unequivocal entries for further software discovery, and applying the filtering rules against the collected registry entries based on the filtering method.

According to another aspect, a software discovery system for identifying unmatched registry entries may be provided The software discovery system may comprise a scanning unit adapted for scanning a file system and discovering software, a first collection unit adapted for collecting first attribute values of the discovered software, and a receiving unit adapted for receiving a plurality of filtering rules, each rule comprising at least an attribute and a filtering method, wherein the attribute may comprise software-specific conditions.

Additionally, the software discovery system may comprise a second collection unit adapted for collecting native registry entries comprising second attribute values indicated by the attributes of at least one of the rules, a comparison module adapted for comparing the first attribute values of the discovered software with related ones of the second attribute values of the collected native registry entries, and a grouping module adapted for grouping the native registry entries into two groups, wherein a first group may represent matched registry entries and a second group may represent unmatched registry entries, thereby identifying unmatched registry entries as unequivocal entries for further software discovery. Finally, the software discovery system may comprise an applying unit adapted for applying the filtering rules against the collected registry entries based on the filtering method.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Other features and advantages of this invention will become apparent from the following detailed description of the presently preferred embodiment(s), taken in conjunction with the accompanying drawings.

BRIEF DESCRIPTION OF THE SEVERAL VIEWS OF THE DRAWINGS

It should be noted that embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the embodiments are apparent from the examples of embodiments to be described hereinafter and are explained with reference to the examples of embodiments, but to which the invention is not limited.

Figure 1:
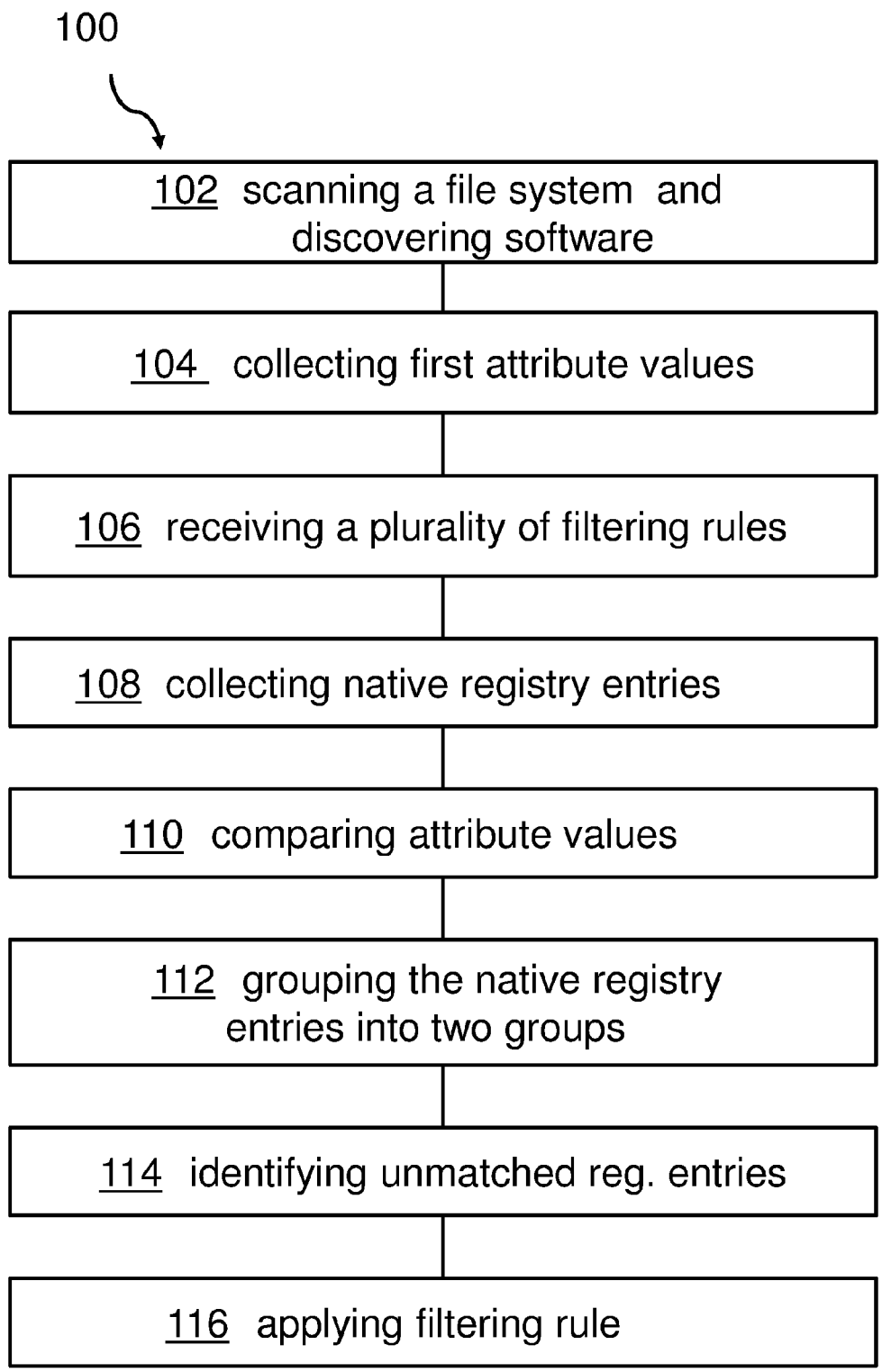

Preferred embodiments of the invention will be described, by way of example only, and with reference to the following drawings:

FIG. 1 shows a block diagram of an embodiment of the inventive method for identifying unmatched registry entries.

Figure 2:
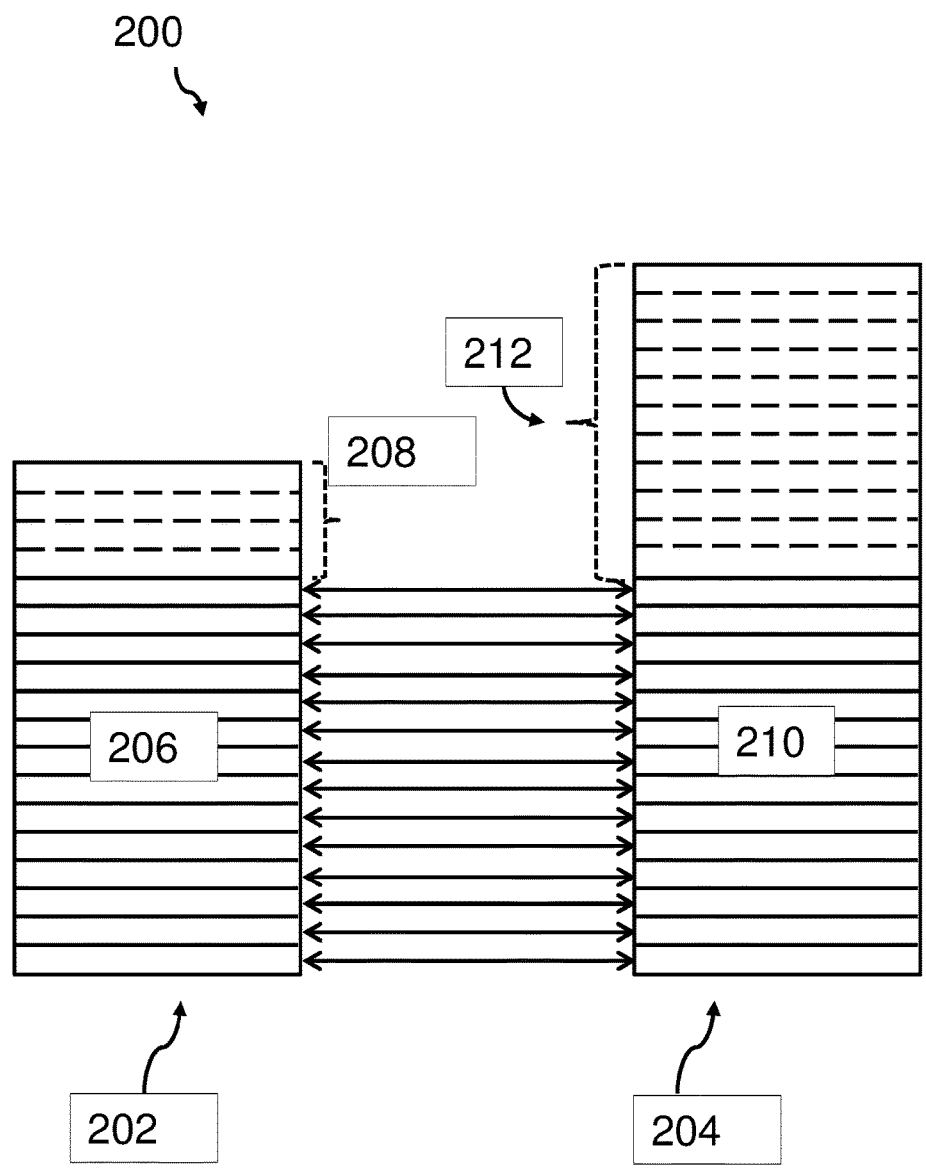

FIG. 2 shows a block diagram of a stack of discovered software and a stack of entries in a registry.

Figure 3:
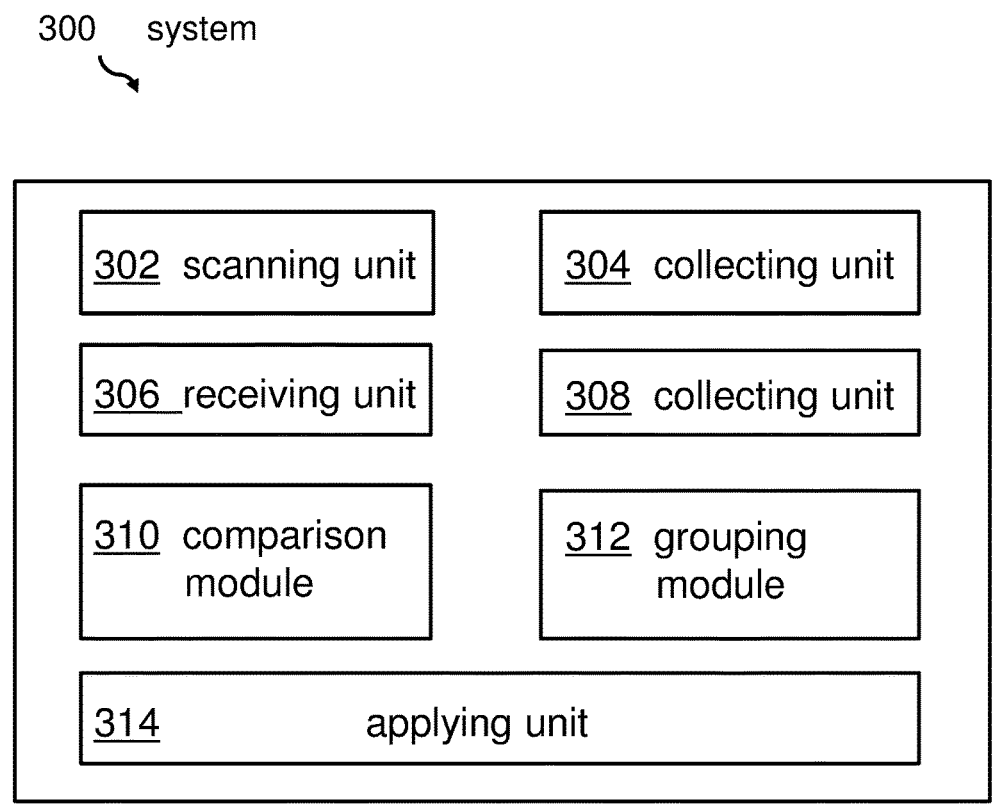

FIG. 3 shows a block diagram of an embodiment of the software discovery system for identifying unmatched registry entries.

Figure 4:
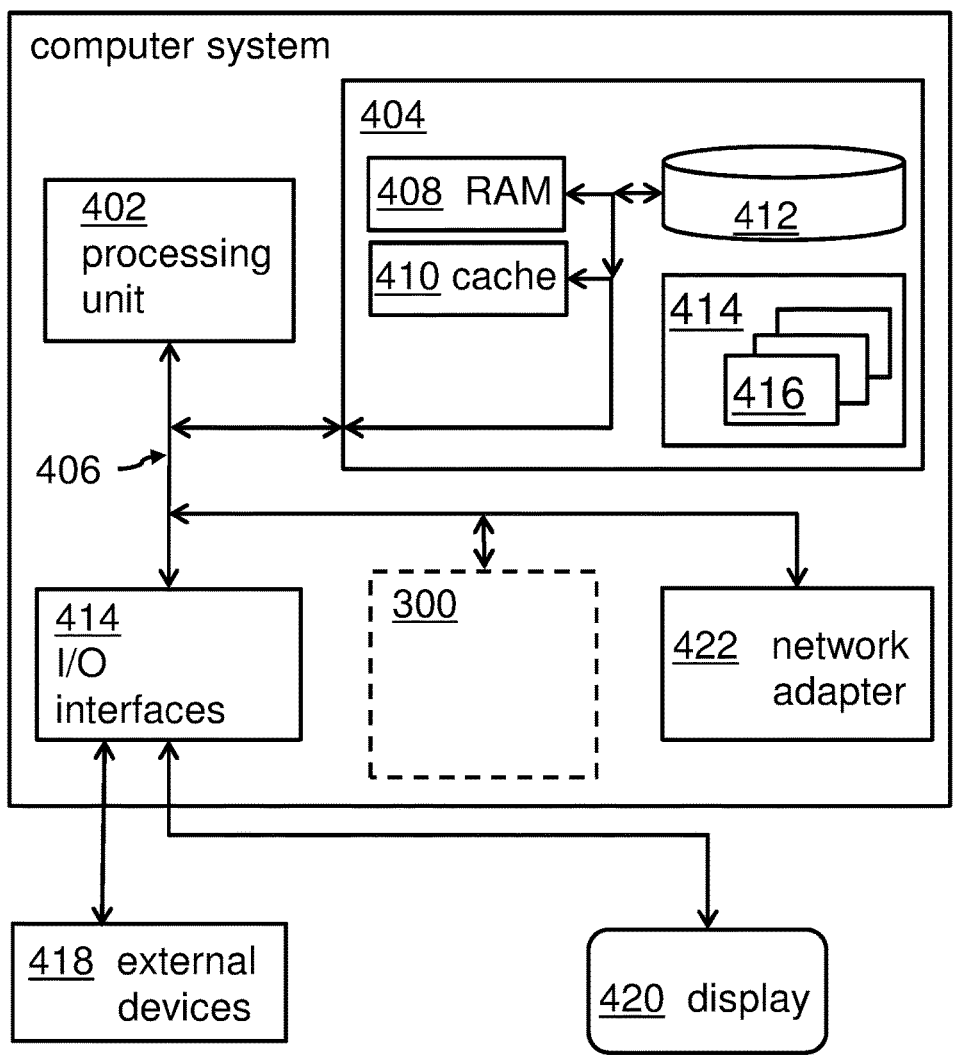

FIG. 4 shows an embodiment of a computing system comprising the software discovery system for identifying unmatched registry entries.

DETAILED DESCRIPTION

In the context of this description, the following conventions, terms and/or expressions may be used:

A "registry" may denote data storage, e.g., a database—that may store configuration settings—in particular of software products and/or services and its extensions—of an operating system of a computing system. It may contain settings for low-level operating system services as well as for applications running on the computing platform using the registry. A registry entry may be named a "native registry entry" if the registry may be used unchanged in the way they are stored in the registry.

The term "unmatched registry entry" may denote an entry in a registry of supposedly installed software on a computing platform comprising a machine and an operating system. The machine may be a physical machine or a virtual machine. The term machine may here be equivalent to the term system or computing system. The registry entry may be named unmatched if no real software installation on the machine of the supposedly installed software identified by the registry may be found in the file system, i.e., not being installed. Thus, the registry may comprise an indication for installed software—or installed software product—that in reality may not be installed at all on the machine. Thus, the registry entry may be wrong or incorrect.

In the same sense, the term "matched registry entry" may be interpreted. In this case, the matched registry entry may reflect an installed piece of software—e.g., a software product or service—on the machine. The software may be application software, middleware, part of an operating system, a service, an electronic catalogue, a database with content and/or comparable elements. If during the matching process—using a scanning agent or scanning component—between registry entries and actually installed software components, it may turn out that there is a match, then the registry entry may be "filtered out" because no further processing, handling or investigation may be required for the specific registry entry: Reality—as a result of the scanning process—is reflected in the registry entry.

The filtering-out may be accomplished by setting a mark or indicator in the list of unmatched registry entries indicating that the related entry has a corresponding discovered installed software on the file system.

The term "scanning" may denote searching a file system of a computing system for installed software or similar elements, as discussed above. The software may be identified by several characteristics (see below).

The term "discovering" may denote finding an installed software component during the scanning process (see above).

The term "file system" may denote a typical organization of data files or datasets in a storage or memory of a computer system being managed by an operating system. The file system may comprise directories and sub-directories in which individual files may be stored. Known examples of a file system may be the UDF (universal file system), the FAT file system (file allocation table), the Unix file system, or the HPFS (high performance file system), just to name a few.

The term "attribute value" may denote an attribute of a software product or executable. Examples of attributes may comprise an installation path of the software, a file size (i.e., number of bytes), or available header information of an executable of the software. An executable may simply mean a program that may be executed by the computer system. Some executables may comprise information about itself like the vendor from which the executable software may originate from, a product family name, a product specific name, a product version and/or release and/or any other attribute that may further describe characteristics of the software. The attribute itself may be understood as a category of a characteristic of a specific installed software product. The attribute value may consequently denote an actual value of an attribute.

The term "filtering rule" may denote an algorithm for comparing attribute values. The attribute may define a characteristic element of the software, as defined above. A part of the filtering rule may be a filtering method, i.e., filtering algorithm, as well as a specific attribute. This way, different filtering rules may be applied to the same or different attributes using different filtering mechanisms or comparison techniques. This may comprise similarity comparisons—in particular, determining a certain degree of similarity—of different values of comparable attributes or, also of values of different attributes. i.e., a first value of a first attribute may also be comparable to a value of a second attribute. It may be noted that filtering rules may be freely definable and applicable in variable sequences. However, it may also be noted that the sequence of available filtering rules may be definable by, e.g., priorities for different rules. An advantage of this approach may be seen in the fact that filtering rules with a higher success rate of comparing attribute values in a certain environment may be applied first before less performing filtering rules requiring more resources—of the computing system—may be applied.

This may also open-up the opportunity for a self-learning system by changing priorities of certain filtering rules depending on a computing system/operating system environment or other environmental parameters. Those filtering rules from which a higher success rate is expected may be applied first against the collected registry entries and discovered software based on the prioritized filtering method.

The term "unequivocal entries" may denote certain entries, in particular unmatched registry entries which may have been identified without ambiguity. Thus, these entries may have been identified as unmatched registry entries without any doubt. Therefore, they do need to undergo a further investigation in order to clarify its origin.

The term "filtering rule priority" may denote a marker, e.g., a number, defining a priority for applying a filtering rule. Any numbering schema may be used. The filtering rule priority for a specific filtering rule in combination with a specific attribute may be increased automatically if the related filtering rule may have performed better than another rule—e.g., requiring less time or less computing resources—by a count of, e.g., 1.

The proposed method for identifying unmatched registry entries may offer a couple of advantages and technical effects:

The introduction of cross-domain filtering rules or simple filtering rules with attributes may ensure a better matching rate between discovered software and software registered in a catalogue. A mismatch is typical in today's computer systems. Even well managed computer systems show this effect of not being able to track installed software 100% over the lifetime of a computer system. Operating system or software updates may corrupt some originally correct settings; in other cases, updates of the software itself may not be registered correctly. All of these issues and more mismatch reasons may be addressed by the proposed method and system.

Due to the mutually independent rules comprising the at least attribute and a defined filtering method, more matched may be identified between a software catalogue, i.e., registry entries, and a list of discovered software from a software discovery agent or system, running on a regular or irregular basis to scan a computer system, and uncovering mismatches in an even more elegant way. This may save time and effort for data center operators because the number of unmatched registry entries, which may require a manual treatment for software discovery, may be reduced. A consequence of this may be that no or only little manual work may be performed as after-work after such as software discovery and matching process.

In the following, a detailed description of the figures will be given. All instructions in the figures are schematic. Firstly, a block diagram of an embodiment of the inventive method for identifying unmatched registry entries is given. Afterwards, further embodiments as well as a related embodiment of the software discovery system will be described.

FIG. 1 shows a block diagram of an embodiment of the method 100 for identifying unmatched registry entries. The exemplary method 100 comprises scanning, 102, a file system and discovering software, collecting, 104, first attribute values of the discovered software, and receiving, 106, a plurality of filtering rules, each rule comprising at least an attribute and a filtering method, wherein the attribute comprises software-specific conditions. Furthermore, the method 100 continues with collecting, 108, native registry entries comprising second attribute values indicated by the attributes of at least one of the rules, and comparing, 110, the first attribute values of the discovered software with related ones of the second attribute values of the collected native registry entries. Then, the method 100 may continue by grouping, 112, the native registry entries into two groups. A first group may represent matched registry entries and a second group may represent unmatched registry entries. Thereby, unmatched registry entries may be identified, 114, as unequivocal entries for a further software discovery process. This may be a manual or semi-automated process and may eventually not be part of the proposed method. Then, the filtering rules—at least one of them—may be applied, 116, against the collected registry entries—in particular, the unmatched registry entries—based on the filtering method.

According to one preferred embodiment, the method 100 may also comprise adapting filtering rule priorities dependent on the applying, 116, by setting a higher priority to a filtering rule which may provide a higher number of matched registry entries. This determination, which rule may be assigned a better performance, may e.g., be a result of a previous usage of the method. A certain rule may have delivered more matches between registry entries and discovered software than another rule. This result may be used to increase the priority of that higher performing filtering rule. In case of a next usage of the method, the order of the filtering rules may have been redefined by the increase of a priority of a certain rule compared to other filtering rules. Using priorities for the filtering rules may decrease the time required for the executing the method for identifying unmatched registry entries because of a higher efficiency of the sequence of applied filtering rules.

According to one permissive embodiment of the method 100, the first attributes and/or the second attributes for an executable of a software product comprises at least an installation path, a file size of an executable file, or a component of header information of a software executable. This way, discovered installed software may be identifiable against registry entries. The attributes may be used as indicators for a match. In one embodiment only one attribute may be used, wherein in another embodiment a plurality of attributes may be used for a comparison. The more uncertain indicators for an equivalence of discovered installed software in comparison to registry entries are, the more attributes may be used for a determination of identity.

According to one optional embodiment of the method 100, one of the filtering rules may be delivered as a service. Thus, any computing system in a data center may be defined as a system for executing the inventive method. It may not be necessary to install software for specific hardware to enable an execution of the method for identifying unmatched registry entries on any client computer system of a larger data center network.

According to a preferred embodiment of the method 100, one of the filtering rules may be extendable through additional filtering methods. The filtering rules may be adaptable and flexible in terms of filtering methods and use parameters or attributes. The filtering rules may be supplied by a vendor or may be defined by a user, or administrator, or operator of the computer systems. Thus, there may be provided an adaptable, self-learning and expandable architecture for identifying unmatched registry entries. It may be noted that the filtering rules may not only apply fixed filtering methods. Additionally, the number of rules used for the method for identifying unmatched registry entries may also be flexible. In one case, only one filtering rule comprising one attribute has a parameter and one filtering method be used. In another case, a set of filtering rules using a varying set of attributes and filtering methods—thus, flexible and adaptable conditions—may be used advantageously.

According to one advantageous embodiment of the method 100, the filtering method may be a software path rule, wherein elements of the group of unmatched registry entries are transferred to the group of matched registry entries if a directory path attribute value of the first attributes of the discovered software matches a directory path attribute value of the unmatched registry entries. This may define a pretty straightforward filtering method. In this case, the attribute may be the installation path of the software.

According to another advantageous embodiment of the method 100, the filtering method may be a software identifier similarity rule, wherein elements of the group of unmatched registry entries are transferred to the group of matched registry entries if an identifier attribute value of header information of the first attributes of the discovered software matches an identifier attribute value of the unmatched registry entries. In this case, the attribute of the discovered software and the unmatched registry entries may be easily identifiable as the software identifier or name of the software. However, it may not be so easy in every case. The identifier of the software or the name may be coded into various other attributes of the header information of an executable of discovered software. In this case, different values of different attributes may be compared in order to determine whether the identified installed software matches an unmatched registry entry.

According to one additionally preferred embodiment of the method 100, the identifier attribute value of the header information may comprise a software name attribute value, a version attribute value or a vendor name attribute value. Other optional identifier attributes may comprise a software identification number—like a bar code on consumer goods—or a revision number of a certain version. A skilled person will know other potentially usable attributes.

According to one advantageous embodiment of the method 100, registry entries may be transferred to the group of matched registry entries if an attribute value of the first attributes of the discovered software is similar to a related second attribute value of the group of matched registry entries. In this case, different categories, i.e., different attributes may be compared if their values may be related to each other in the sense that an identity or similarity may be determined. This concept may be applied in case of an unknown structure of header information of an executable of the software.

According to one additional, preferred embodiment of the method 100, the similarity may be determined by using at least one out of the group comprising a Jaro Winkler distance, a Levenstein distance, a Damerau-Levenstein distance, a Longest Common Sub-Sequence distance and a Hamming distance. It is assumed that a skilled person may know the difference between the mentioned similarity distances. However, other similarity rules as part of a filtering rule may be defined and implemented at any time as part of the method for identifying unmatched registry entries. Additionally, also internal parameters of the just mentioned distance calculation methods may be altered by the received filtering rules. Thus, an operator may not be dependent on any externally provided filtering rules/filtering methods. He may—dependent on his individual computing environment—define his own filtering rule(s). Additionally, different vendors may deliver different filtering rules to an operator.

Additional figures will show additional features of the proposed method 100 and related system.

FIG. 2 shows a block diagram 200 of a stack 202 of discovered software and a stack 204 of entries in a registry. The double arrows between the stack 202 of discovered software and the stack 204 of entries in the registry may indicate that a match between these entries could be achieved. Thus, the install software that has been discovered by scanning a file system has also been found in the stack 204 of entries in the registry. The remaining entries 208 in the stack 202 of discovered software may not have corresponding entries in the stack 204 of registry entries. This may be because, e.g., an installation process for executable software in a file system may not have generated corresponding entries in the registry. Alternatively, registry entries of software may have been deleted, although the software remains installed in the file system.

On the other side, as part of the stack 204 of registry entries additional entries 212 are shown which may not have corresponding entries in the stack 202 of discovered installed software. These entries may be leftovers of previously installed software products which may have been removed from a file system not using proper tools which may also have cleaned-up corresponding entries in the registry. Hence, there is a mismatch between discovered installed software products or executables and entries in a software catalogue or registry which should correspond to install software but actually do not.

For a proper license management, it may be required to keep the number of entries 208 and 212 to a minimum. Thus, a sophisticated matching process between the left-over entries 208, 212 may be required. In order to perform this matching process, the method 100 for identifying unmatched registry entries is proposed in this document. In the beginning, the complete stack 204 of registry entries may be assumed to be unmatched registry entries. As part of a standard software discovery process, more and more installed software products may be discovered and being matched against entries in the stack 204 of registry entries. The goal to minimize the left-over entries 208 and 212 has been described in the context of FIG. 1.

It may be noted that entries in the stack 204 of unmatched registry entries may not be deleted physically from the stack but marked as matching with discovered installed software. A reverse entry may be made in the stack 202 of discovered, installed software.

It may be also worthwhile noting that in order to minimize the group of entries 208 the proposed filtering rule may also be instrumental because—depending on the computing environment—the rule, i.e., the looked-at attributes and attribute values and the applied filtering method may be adapted. Additionally, the priority of a certain filtering rule may change the order different filtering rules may be applied to the left-over entries 208, 212.

It may also be possible to compare the left-over entries 210 of unmatched registry entries with the portion of the stack 202 of discovered installed software identifying discovered installed software 206. Thus, it may happen that two registry entries may point to the same discovered, installed software 206.

As a side remark, it may be noted that independent of the number of filtering rules and their sequence depending on the potential priority of a filtering rule, the final number of unmatched registry entries may be independent of the sequence of filtering rules applied. However, the performance of the proposed method may be impacted significantly depending on the sequence the filtering rules may have been applied. As an example, a first filtering rule may not be very efficient, i.e., not filtering out a high number of unmatched registry entries. This may require a first amount of time to be completed. A second filtering rule may be applied next having a higher performance. However, if the second filtering rule may be applied first, then less unmatched registry entries may be left over for an application of the second filtering rule. As a result, the sum of the execution time of the filtering rules may be shorter in the second of the described cases.

FIG. 3 shows a block diagram of an embodiment of the proposed software discovery system for identifying unmatched registry entries. The system comprises a scanning unit 302 adapted for scanning a file system and discovering software and a first collection unit 304 adapted for collecting first attributes or attributes values of said discovered software. A receiving unit 306 may be used for receiving a plurality of filtering rules. As already discussed, each rule comprises at least one attribute and a filtering method. The attribute may comprise software-specific conditions for a comparison between unmatched registry entries and discovered installed software.

A second collection unit 308 may be instrumental for collecting native registry entries comprising second attribute values indicated by said attributes of at least one of the rules, and a comparison module 310 is used for comparing said first attribute values of said discovered software with related ones of the second attribute values of said collected native registry entries, An additional grouping module 312 groups the native registry entries into two groups in which a first group represents matched registry entries, and a second group represents unmatched registry entries. Thereby, unmatched registry entries are identified as unequivocal entries for further software discovery. A further applying unit 314 is applying the filtering rule or rules against said collected registry entries based on said filtering method.

Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

Program/utility 414, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, software discovery system for identifying unmatched registry entries 300 may be attached to the bus system 406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an"

and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for identifying unmatched registry entries, said method comprising:
    scanning a file system and discovering software;
    collecting first attribute values of said discovered software;
    receiving a plurality of filtering rules, each rule comprising at least an attribute and a filtering method, wherein said attribute comprises software-specific characteristics;
    collecting native registry entries comprising second attribute values indicated by said attributes of at least one of said rules;
    comparing said first attribute values of said discovered software with related ones of said second attribute values of said collected native registry entries;
    grouping said native registry entries into two groups, wherein a first group represents matched registry entries and a second group represents unmatched registry entries, thereby identifying at least a portion of the unmatched registry entries as unequivocal entries for further software discovery; and
    applying said filtering rules against the second group based on said filtering method, wherein the filtering rules are applied in order of their priority, wherein applying said filtering rules further comprises managing software licenses by reducing a number of the unmatched registry entries.

2. The method according to claim 1, further comprising adapting filtering rule priorities dependent on said applying by setting a higher priority to a filtering rule which provides a higher number of matched registry entries.

3. The method according to claim 1, wherein said first attributes and/or said second attributes comprise for an executable of a software at least an installation path, a file size of an executable file, or a part of header information of a software executable.

4. The method according to claim 1, wherein one of said filtering rules is delivered as a service.

5. The method according to claim 1, wherein one of said filtering rules are extendable through additional filtering methods.

6. The method according to claim 1, wherein said filtering method is a software path rule, wherein elements of said group of unmatched registry entries are transferred to said group of matched registry entries if a directory path attribute value of said first attributes of said discovered software matches a directory path attribute value of said unmatched registry entries.

7. The method according to claim 1, wherein said filtering method is a software identifier similarity rule, wherein elements of said group of unmatched registry entries are transferred to said group of matched registry entries if an identifier attribute value of header information of said first attributes of said discovered software matches an identifier attribute value of said unmatched registry entries.

8. The method according to claim 7, wherein said identifier attribute value of said header information comprises a software name attribute value, a version attribute value or a vendor name attribute value.

9. The method according to claim 1, wherein registry entries are transferred to said group of matched registry entries if an attribute value of said first attributes of said discovered software is similar to a related second attribute value of said group of matched registry entries.

10. The method according to claim 9, wherein said similarity is determined by using at least one of the group comprising a Jaro Winkler distance, a Levenstein distance, a Damerau-Levenstein distance, a Longest Common Sub-Sequence distance, and a Hamming distance.

11. The method of claim 1, further comprising:
    transferring an entry of the second group to the first group if the applied filtering rule determines that at least one of the first attribute values of the discovered software matches the same at least one attribute of the entry of the second group, wherein the at least one attribute being compared is an attribute associated with the filtering rule; and
    adapting filtering rule priorities dependent on the applying by setting a higher priority to a filtering rule which has either required less time or less computing resources than another filtering rule.

12. A software discovery system for identifying unmatched registry entries, said software discovery system comprising:
    a scanning unit to scan a file system and discovering software;
    a first collection unit to collect first attributes or values of said discovered software;
    a receiving unit to receive a plurality of filtering rules, each rule comprising at least an attribute and a filtering method, wherein said attribute comprises software-specific characteristics;
    a second collection unit to collect native registry entries comprising second attribute values indicated by said attributes of at least one of said rules;
    a comparison module adapted to compare said first attribute values of said discovered software with related ones of said second attribute values of said collected native registry entries;
    a grouping module to group said native registry entries into two groups, wherein a first group represents matched registry entries and a second group represents unmatched registry entries, thereby identifying at least a portion of the unmatched registry entries as unequivocal entries for further software discovery; and
    an applying unit to apply said filtering rules against entries of the second group based on said filtering method, wherein the filtering rules are applied in order of their priority, wherein applying said filtering rules further comprises managing software licenses by reducing a number of the unmatched registry entries.

13. The software discovery system according to claim 12, further comprising an adapting unit adapted to adapt filtering rule priorities dependent on said applying by setting a higher priority to a filtering rule which provides a higher number of matched registry entries.

14. The software discovery system according to claim 12, wherein said first attributes and/or said second attributes comprise for an executable of a software at least an installation path, a file size of an executable file, or a part of header information of a software executable.

15. The software discovery system according to claim 12, wherein one of said filtering rules are extendable through additional filtering methods.

16. The software discovery system according to claim 12, wherein said filtering method is a software path rule, wherein elements of said group of unmatched registry entries are transferred to said group of matched registry entries if a directory path attribute value of said first attributes of said discovered software matches a directory path attribute value of said unmatched registry entries.

17. The software discovery system according to claim 12, wherein said filtering method is a software identifier similarity rule, wherein elements of said group of unmatched registry entries are transferred to said group of matched registry entries if an identifier attribute value of header information of said first attributes of said discovered software matches an identifier attribute value of said unmatched registry entries.

18. The software discovery system according to claim 17, wherein said identifier attribute value of said header information comprises a software name attribute value, a version attribute value or a vendor name attribute value.

19. The software discovery system according to 12, wherein said filtering method is a registry similarity rule, wherein elements of said group of unmatched registry entries are transferred to said group of matched registry entries if an attribute value of said first attributes of said discovered software is similar to a related second attribute value of said group of matched registry entries.

20. A computer program product for identifying unmatched registry entries, said computer program product comprising a computer readable storage device having program instructions embodied therewith, said program instructions being executable by one or more computing devices to cause said one or more computing devices to:

scan a file system and discovering software;

collect first attributes or values of said discovered software;

receive a plurality of filtering rules each rule comprising at least an attribute and a filtering method, wherein said attribute comprises software-specific characteristics;

collect native registry entries comprising second attribute values indicated by said attributes of at least one of said rules;

compare said first attribute values of said discovered software with related ones of said second attribute values of said collected native registry entries;

group said native registry entries into two groups, wherein a first group represents matched registry entries and a second group represents unmatched registry entries, thereby identifying at least a portion of the unmatched registry entries as unequivocal entries for further software discovery; and apply said filtering rules against said collected registry entries of the second group based on said filtering method, wherein the filtering rules are applied in order of their priority, wherein application of said filtering rules further comprising managing software licenses by reducing a number of the unmatched registry entries.

\* \* \* \* \*